3,072,672
Patented Jan. 8, 1963

3,072,672

CERTAIN OXAZOLIDININONE-2 AND PYRROLIDINONE-2 DERIVATIVES OF AROMATIC SULFONAMIDES AND PROCESS

Richard A. Hickner, Midland, Mich., and Claude I. Judd, Mequon, Wis., assignors to The Dow Chemical Company, Midland, Mich., a corporation of Delaware No Drawing. Filed Apr. 17, 1961, Ser. No. 103,228
10 Claims. (Cl. 260—307)

This invention relates to novel chemical compounds, which are aromatic sulfonamides of 2-oxazolidinone and 2-pyrrolidinone, and to a method for their preparation. More particularly, the compounds of the present invention are those having the formula:

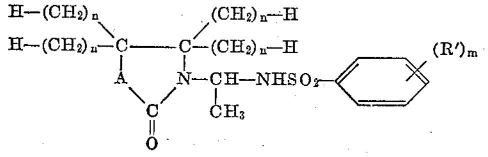

wherein each $n$ is a number from 0 to 4, A is either oxygen or the methylene radical, and R′ is hydrogen or an alkyl group containing from 1 to 4 carbon atoms, or a halogen having an atomic number from 17 to 35; and $m$ is an integer from 1 to 3 when R′ is halogen or alkyl. Preferred sub-generic classes of compounds within the broader class described above are (1) those wherein each $n$ is from 0 to 4, A is oxygen and R′ is hydrogen, (2) those wherein each $n$ is from 0 to 4, A is oxygen, R′ is an alkyl group containing from 1 to 4 carbon atoms, and $m$ is 1 to 3, (3) those wherein A is the methylene radical, $n$ is from 0 to 4, R′ is a halogen having an atomic number from 17 to 35, and $m$ is 1 to 3, and (4) those wherein A is the methylene radical, R′ is hydrogen and $n$ is from 0 to 4.

The compounds of the present invention are conveniently prepared by contacting and thereby effecting reaction between, a vinyl 2-oxazolidinone or a vinyl 2-pyrrolidinone having the formula:

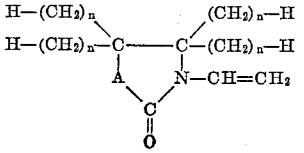

with a benzenesulfonamide having the formula:

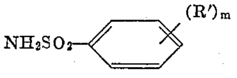

wherein R′, $m$, A, and $n$ have the same significance previously disclosed in the broad generic statement of invention. The reaction is preferably carried out in the presence of an acid catalyst, such as anhydrous hydrogen chloride, concentrated sulfuric acid and various sulfonic acids. A solvent for the reaction mixture is preferably employed and may be any one of a number of solvents that are inert to the acid catalyst. Suitable solvents include benzene, toluene, xylenes, and chlorinated aliphatic hydrocarbons. It is important that all of the components for the reaction be substantially water-free, since the presence of substantial amounts of moisture can cause at least partial hydrolysis of the N-vinyl group and thus decrease the yield of desired product.

Temperatures of from 25–80° C. are preferred for the reaction. Although superatmospheric pressures can be tolerated, atmospheric pressure is most convenient and thus is preferred.

Normally the reaction is completed or substantially completed within a maximum of a half hour, depending upon the reactants used and the reaction temperature. After completion of the reaction, the desired product is then separated from the reaction mixture, conveniently by filtration.

Although virtually any proportion of N-vinyl oxazolidinone or N-vinyl pyrrolidinone to sulfonamide will result in at least a small amount of the desired product, an approximately equimolar ratio is preferred.

The practice of the present invention is illustrated by a series of experiments in each of which a benzenesulfonamide or substituted benzenesulfonamide was reacted with an equimolar amount of a vinyl oxazolidinone or vinyl pyrrolidinone in from 150–300 ml. of benzene in the presence of a trace of acid catalyst. Reaction temperatures varied from 35°–65° C. and in all of the experiments the reaction was completed in about 30 minutes. There are shown in Table I the particular reactants used and the benzenesulfonamide products prepared, and their yields and melting points. In experiments 1 and 2 the catalyst was anhydrous hydrogen chloride and in experiments 3 and 4 concentrated sulfuric acid was used as the catalyst.

*Table I*

| Experiment No. | Sulfonamide | Oxazolidinone or Pyrrolidinone | Benzenesulfonamide Product | Yield, Percent | M.P., ° C. |
|---|---|---|---|---|---|
| 1 | Benzenesulfonamide | 5-methyl-N-vinyl-2-oxazolidinone. | N-(3-(5-methyl-2-oxo-1-oxazolidinyl) ethyl)-. | 93 | 145–148 |
| 2 | p-toluenesulfonamide | do | N-(3-(5-methyl-2-oxo-1-oxazolidinyl) ethyl)-4-methyl-. | 91 | 151–153 |
| 3 | Benzenesulfonamide | N-vinyl-pyrrolidinone | N-(1-(2-oxo-1-pyrrolidinyl) ethyl). | 98 | 143–145 |
| 4 | p-chloro-benzene-sulfonamide. | do | N-(1-(2 oxo-1-pyrrolidinyl) ethyl)-4-chloro-. | 91 | 133–135 |

The compounds of the present invention have excellent utility as fungicides, plant insecticides, anthelmintics and aquatic zootoxins. For example, the novel sulfonamides prepared in experiments 1 and 3 were both evaluated as anthelimintics by testing for control of *Ascaris ova* (roundworm of swine). The two novel compounds were tested by incorporating them singly into feed at concentrations of 0.12 weight percent and 0.50 weight percent, respectively, and the resulting preparations were fed continuously for seven days to mice that had previously been infected with the roundworm of swine. Upon sacrifice of the test mice at the termination of the seven day period and comparison of them with control specimens that had not received any of the test chemicals, it was found that the sulfonamide prepared in experiment 1 effected a 66 percent kill of the roundworms, while that prepared in experiment 3 effected a 100 percent kill of the roundworms.

Upon employing a procedure similar to that previously described, the novel sulfonamide prepared in experiment 1 was evaluated for control of the mouse tapeworm and, when employed at a concentration of 0.25 weight percent of the diet, was found to effect 100 percent control of the mouse tapeworm.

As an example of the utility of the novel compounds as insecticides, the novel sulfonamide prepared in experiment 2 was evaluated as a plant insecticide by testing for control of *Epilachna varivestis* (Mexican bean beetle). The novel compound was tested by dipping into a dispersion of the said compound containing .05 gram per 100 ml. of solvent a series of cranberry bean plants (*Phaseolus vulgaris* L.), withdrawing the plants and allowing them to dry. Then numerous bean beetles were placed on each of the plants, the plants inspected from three to seven days after infestation by the beetles, and compared with untreated controls. The novel sulfonamide was found to effect 60 percent control of the test beetles, compared with untreated control specimens.

The novel sulfonamide prepared in experiment 4 proved to be an excellent aquatic zootoxin when tested for its effect upon the species Daphnia and northern fat-headed minnow. Numerous specimens of these two species were treated separately with aqueous dispersions containing 1 p.p.m. of the sulfonamide, and upon inspection of the treated specimens, it was found that complete control of all specimens of each species had been effected, compared with untreated controls.

The novel sulfonamide prepared in experiment 1 was proven to be an effective fungicide in a series of tests in which numerous specimens of tomato late blight (*Phytophthora infestans*) were applied to plants previously treated with a solution containing 75 p.p.m. of the sulfonamide. Upon inspection of the treated specimens, it was found that 75 per cent control had been effected, compared with untreated specimens.

We claim:

1. A chemical compound having the formula:

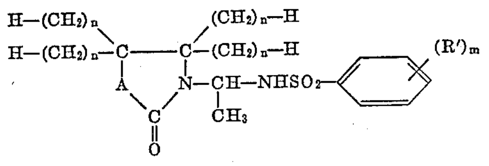

wherein each $n$ is a number from 0 to 4, A is a member selected from the group consisting of oxygen and the methylene radical; R′ is a member selected from the group consisting of hydrogen, an alkyl radical of from 1 to 4 carbon atoms, and a halogen having an atomic number from 17 to 35; and $m$ is an integer from 1 to 3 when R′ is other than hydrogen.

2. A chemical compound as in claim 1 wherein A is oxygen and R′ is hydrogen.

3. A chemical compound as in claim 1 wherein A is oxygen and R′ is an alkyl radical containing from 1 to 4 carbon atoms.

4. A chemical compound as in claim 1 wherein A is the methylene radical and R′ is a halogen having an atomic number from 17 to 35.

5. A chemical compound as in claim 1 wherein A is the methylene radical and R′ is hydrogen.

6. N - (1 - (2-oxo-1-pyrrolidinyl)ethyl)benzenesulfonamide.

7. N-(1-(5-methyl-2-oxo-3-oxazolidinyl)ethyl)benzenesulfonamide.

8. N-(1 - (5 - methyl-2-oxo - 3 - oxazoldinyl)ethyl)-4-methyl benzenesulfonamide.

9. N-(1-(2-oxo-1-pyrrolidinyl)ethyl)-4-chloro benzenesulfonamide

10. A process for preparing a sulfonamide having the formula:

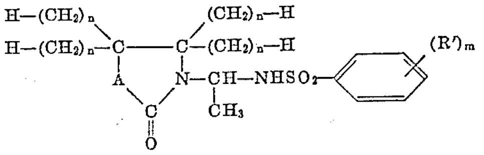

wherein each $n$ is a number from 0 to 4, A is a member selected from the group consisting of oxygen and the methylene radical; R′ is a member selected from the group consisting of hydrogen, an alkyl radical of from 1 to 4 carbon atoms, and a halogen having an atomic number from 17 to 35, and $m$ is an integer from 1 to 3 when R′ is other than hydrogen; said process comprising, contacting, at a temperature of from about 25° C. to about 80° C., a compound having the formula:

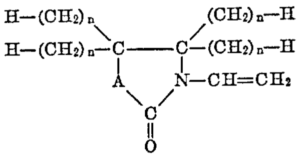

with a sulfonamide having the formula:

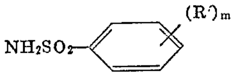

wherein each $n$, A, R′ and $m$ have the same significance previously disclosed, and separating the desired sulfonamide from the reaction mixture.

No references cited.